United States Patent
Sandercock et al.

(10) Patent No.: US 9,932,958 B2
(45) Date of Patent: Apr. 3, 2018

(54) TURBINE BLADE SHEAR WEB ALIGNMENT

(71) Applicant: Vestas Wind Systems A/S, Aarhus N. (DK)

(72) Inventors: Stephen Sandercock, Ryde (GB); Steve Wardropper, Hampshire (GB)

(73) Assignee: Vestas Wind Systems A/S, Aarhus N. (DE)

( * ) Notice: Subject to any disclaimer, the term of this patent is extended or adjusted under 35 U.S.C. 154(b) by 320 days.

(21) Appl. No.: 14/654,190

(22) PCT Filed: Dec. 12, 2013

(86) PCT No.: PCT/DK2013/050429
§ 371 (c)(1),
(2) Date: Jun. 19, 2015

(87) PCT Pub. No.: WO2014/094780
PCT Pub. Date: Jun. 26, 2014

(65) Prior Publication Data
US 2015/0316023 A1  Nov. 5, 2015

(30) Foreign Application Priority Data
Dec. 20, 2012  (DK) ................................ 2012 70808

(51) Int. Cl.
*F03D 1/00* (2006.01)
*F03D 1/06* (2006.01)
(Continued)

(52) U.S. Cl.
CPC .............. *F03D 1/001* (2013.01); *B25B 11/00* (2013.01); *B29D 99/0028* (2013.01);
(Continued)

(58) Field of Classification Search
CPC ........ F03D 1/001; F03D 1/0675; F03D 13/10; B29D 99/0028; B25B 11/00;
(Continued)

(56) References Cited

U.S. PATENT DOCUMENTS

| | | |
|---|---|---|
| 6,170,157 B1 | 1/2001 | Munk et al. |
| 2004/0034977 A1 | 2/2004 | Heck et al. |
| 2005/0116105 A1 | 6/2005 | Munk et al. |
| 2007/0261787 A1* | 11/2007 | Malis .................... B29C 65/542 156/285 |
| 2010/0260611 A1* | 10/2010 | Rudling ................ F03D 1/0675 416/226 |
| 2011/0126978 A1 | 6/2011 | Gau |

(Continued)

FOREIGN PATENT DOCUMENTS

| | | |
|---|---|---|
| DE | 480187 C | 8/1929 |
| EP | 2368792 A2 | 9/2011 |
| WO | 2010065928 A1 | 6/2010 |

OTHER PUBLICATIONS

European Patent Office, International Search Report and Written Opinion issued in International application No. PCT/DK2013/050429 dated Apr. 24, 2014.
(Continued)

*Primary Examiner* — Igor Kershteyn
(74) *Attorney, Agent, or Firm* — Wood Herron & Evans LLP

(57) ABSTRACT

A method of aligning shear webs for the construction of a wind turbine blade is provided. The method comprises providing one or more jigs (402), each configured to receive one or more spacer elements (701) and providing one or more spacer elements (701). First and second shear web panels are placed on the one or more jigs (402) to align them. The first and second shear web panels are restrained relative to each other and are separated by the one or more spacer elements. The first and second shear web panels are then removed together with the one or more spacer elements from the jig. A corresponding apparatus is also provided.

42 Claims, 9 Drawing Sheets

(51) Int. Cl.
*B29D 99/00* (2010.01)
*B25B 11/02* (2006.01)
*B25B 11/00* (2006.01)
*F03D 13/10* (2016.01)
*F16B 11/00* (2006.01)
*F16B 1/00* (2006.01)

(52) U.S. Cl.
CPC ........... *F03D 1/0675* (2013.01); *F03D 13/10* (2016.05); *F16B 11/006* (2013.01); *F16B 2001/0092* (2013.01); *Y02E 10/721* (2013.01); *Y10T 29/49341* (2015.01); *Y10T 29/53435* (2015.01)

(58) Field of Classification Search
CPC ............ F16B 11/006; F16B 2001/0092; Y10T 29/49341; Y10T 29/53435; Y02E 10/721
See application file for complete search history.

(56) References Cited

U.S. PATENT DOCUMENTS

| | | | |
|---|---|---|---|
| 2012/0027612 A1 | 2/2012 | Yarbrough | |
| 2013/0129518 A1* | 5/2013 | Hayden | F03D 1/0675 416/226 |
| 2015/0224759 A1* | 8/2015 | Boon | B29C 70/38 156/324 |

OTHER PUBLICATIONS

Danish Patent and Trademark Office, Search Report issued in Application No. PA 2012 70808 dated Jul. 25, 2013.

* cited by examiner

TURBINE BLADE SHEAR WEB ALIGNMENT

FIELD OF THE INVENTION

The present invention relates to rotor blades for wind turbines and to a method and corresponding apparatus for aligning the shear webs used in such blades.

BACKGROUND

A typical horizontal axis wind turbine is illustrated in FIG. 1. The wind turbine 1 comprises a tower 2, a nacelle 3 mounted on top of the tower 2 and a rotor 4 operatively coupled to a generator 5 within the nacelle 3. The wind turbine 1 converts kinetic energy of the wind into electrical energy. In addition to the generator 5, the nacelle 3 may house the various components required to convert the wind energy into electrical energy and also the various components required to operate and optimize the performance of the wind turbine 1. The tower 2 supports the load presented by the nacelle 3, the rotor 4 and other wind turbine components within the nacelle 3.

The rotor 4 includes a central hub 6 and three elongate rotor blades 7a, 7b, 7c of approximately planar configuration that extend radially outward from the central hub 6. In operation, the blades 7a, 7b, 7c are configured to interact with the passing air flow to produce lift that causes the central hub 6 to rotate about its longitudinal axis. Wind exceeding a minimum level will activate the rotor 4 and allow it to rotate within a plane substantially perpendicular to the direction of the wind. The rotation is converted to electric power by the generator 5 and is usually supplied to the utility grid.

The turbine blades have a root section at which it connects to the central hub. The root section is generally circular in cross section and for blades which are 80 m or more in length can be as much as 4 or 5 meters in diameter. At the opposite end of the blade to the root is the blade tip. The direction along the blade between the root and the blade tip is known as the span-wise direction. In the lateral direction, known as the chord-wise direction, the blade extends between a leading edge and a trailing edge.

FIG. 2 shows an example rotor blade construction, with the exploded perspective view in FIG. 2 showing the elements used in the construction of such a rotor blade. The rotor blade is formed from two half shells 202 and 206 which each comprise elongate reinforcing structures 204. The two reinforcing structures that extend substantially along the full length of the turbine blade from the root section to the blade tip are referred to as spar caps. The complete turbine blade is formed from the two half shells 202 and 206 and two shear web 205 placed in between. The shear webs 205 are used to couple together the spar caps in order to transfer shear forces.

The shear webs are formed from first and second shear web panels that need to be aligned with one another. Since the blade may be up to 80 m long, or more, the shear webs are preferably formed from a number of segments of corresponding shear web panels. For example, the segments may be formed of shear web panels that are around 10 m or 11 m in length, so that they fit in a standard transport container. It is possible to form the shear web panels with a connecting element between them, in a so called "top hat" or substantially "U" shaped arrangement. This has the advantage that the shear web panels can be manufactured and maintained in alignment with each other. Unfortunately, the use of a connecting element between the shear web panels is not practical at the root of the blade due to the large size of resulting top hat arrangement. Therefore, the larger shear web panels found nearer to the blade root need to be separately installed and aligned with each other during the manufacture of the blade.

Aligning adjacent shear web panels with each other can be a time consuming process, which must take place at the time critical final stages of assembly of the blade, during which a number of process are being undertaken at the same time.

Therefore it is desirable to provide a method of aligning shear web panels for insertion into a wind turbine blade in an easy manner and that avoids the problem of having to perform time consuming alignment within the blade itself.

SUMMARY OF THE INVENTION

The invention is defined in the independent claims, to which reference is now directed. Preferred features are set out in the dependent claims.

In accordance with a first aspect of the invention there is provided a method of aligning shear webs for the construction of a wind turbine blade. The method comprises providing one or more jigs, each configured to receive one or more spacer elements, and providing one or more spacer elements. First and second shear web panels are placed on the one or more jigs to align them with one another. The first and second shear web panels are restrained relative to each other and are separated by the one or more spacer elements. The first and second shear web panels are then removed, together with the one or more spacer elements, from the jig.

By aligning the shear web panels on the jig and using the spacer elements the alignment of the shear web panels can be maintained when the panels are inserted into a turbine blade during blade construction. This avoids the need for complicated alignment methods when the shear web panels are being positioned in the blades, which can be a time critical process.

Restraining the first and second shear web panels may include applying adhesive to the one or more spacer elements to adhere the spacer elements to each of the shear web panels. The spacer elements may therefore be used to restrain the panels, and particularly to prevent them from separating. In addition, or alternatively, restraining the first and second shear web panels may include applying an urging or clamping force to urge them together.

The one or more jigs may each comprise one or more recesses for receiving spacer elements, allowing multiple spacers to be used on each jig. The one or more jigs may each comprise at least two recesses for receiving spacers, the recesses being located, in use, at different heights to one another on the jig such that the spacers are located at different heights when in position between the shear web panels. Placing the spacer elements at different heights ensures that the resistive forces exerted by the spacers on the panels are spread out over a greater area. The recesses may be further displaced from one another on the jig such that, in use, the spacers are displaced from one another in a direction along the length of the shear web panels. Again, displacing the locations of the spacers helps to avoid the concentration of the resistive force of the spacers.

Each jig may comprise a hole for passing a clamp through, the hole being positioned proximate to one of the spacer receiving recesses, the application of an urging force being achieved by applying a clamp to the shear web panels in the vicinity of the spacer element proximate to the hole.

Applying the clamping force directly to the spacer elements avoids unnecessary stress or force on the shear web panels.

Each of the one or more jigs may comprise a body portion, for receiving the spacer elements, and a support member for supporting the panels in use. Preferably the support member includes a mounting assembly configured to receive the first and second shear web panels, with the body portion being located between the shear web panels when they are mounted on the jigs. The mounting assembly may further comprise two mounting edges, the mounting edges configured to receive and support the first and second shear web panels in alignment, such that the first and second shear members are supported along one of their edges by the mounting edges of the jig, with the shear members being in an upright position, the spanwise dimension being approximately parallel to the floor on which the jigs are mounted. The mounting edges may have a form complementary to a flange on the shear web panels so as to accommodate said flange when the shear web panels are being aligned. Furthermore, the mounting assembly may be located, in use, beneath points of coupling between the spacer elements to the panels by a distance sufficient to accommodate a flange along the edge of at least one of the shear web panels that projects in a direction towards the other shear web panel when the shear web panels are mounted on the jigs.

The body portion may comprise first and second body panels having a separation between them to allow a portion of the spacers to extend into the spacing between the first and second body panels. Where the spacer has a shape with an engagement section, such as a "T" shape, as will be described below, this allows the engagement section, such as the tip of the "T", to extend down between the two panels, making it more secure when mounted in the jig.

The jig may be configured such that, in use, there is no jig structure above any of the recesses in the jig so as to allow the shear webs to be lifted from the jig along with the spacer elements. This allows the recesses to be located at different heights, whilst avoiding obstructing the path of the spacer elements as they are removed with the shear web panels from the jigs. In particular, the body portion may be comprised of two sections forming a substantially "L" shaped cross section, wherein, in use, a first section extends in a direction along the length of the shear web panel and a second section extends in a direction substantially perpendicular to the first section. Preferably the first section has a recess to receive a first spacer and the second section has a recess to receive a second spacer.

The step of providing one or more jigs may comprise providing a plurality of jigs spaced apart along the length of the shear web panels to receive the first and second shear web panels. Each of the jigs may be configured to successively support the first and second shear web panels at a greater height above the ground than the preceding jig, when the shear webs are mounted on the jigs, so as to account for a tapering in the shear web panels along their length.

The spacers, or spacer elements, may be comprised of a lightweight material, such as foam blocks. The spacers are preferably made of material that can hold the panels in alignment without adding unnecessary additional weight to the overall structure. Since the spacers are not required to transmit load forces experienced during the use of a wind turbine blade, a lightweight material is suitable for this.

At least some of the spacers may comprise an engagement section for receiving an engagement marker positioned on the inner surface of a turbine blade for correctly positioning the shear web panels in the blade. The spacers may be received on the jigs so as to contact the shear web panels along their long edges when they are mounted on the jigs, and wherein the spacers positioned along one of the edges of the shear webs comprise an engagement section, the engagement section being of reduced length along the direction between the first and second shear web panels and extending in a direction towards the edge of the shear web and extending to said edge. As mentioned above, the spacers having an engagement section may have substantially a "T" shaped cross section.

The one or more jigs may be provided together with one or more spacer elements, the spacer elements being preloaded on the jigs. Alternatively, the method may involve the step of placing the one or more spacer elements on the one or more jigs, this step preferably being performed before placing the first and second shear web panels on the one or more jigs.

In accordance with a second aspect of the invention a method is provided of inserting two shear webs, aligned according to any of the methods described herein, into a wind turbine blade formed from two opposing half-shells. The method comprises: providing a half-shell of a wind turbine blade; spacing markers along the inner surface of the shell, the spacings between the markers corresponding to the spacings between respective spacer elements of the shear webs; aligning the spacers of the shear webs with the markers; engaging the spacers with the markers; and fixing the shear webs to the inner surface of the shell. The markers may be engagement markers that are configured to engage with an engagement section in one or more of the spacer elements.

In accordance with a third aspect of the invention a jig is provided for use in the methods described herein. The jig comprises one or more recesses for receiving one or more spacer elements and a mounting assembly configured to support first and second shear web panels such that the recesses for the spacer elements are located between the shear web panels when mounted on the jig.

Providing such a jig allows shear web panels on the jig to be aligned with spacer elements provided between them to maintain alignment when the panels are inserted into a turbine blade during blade construction.

The jig may comprise at least two recesses for receiving spacers or spacer elements, the recesses being located, in use, at different heights to one another on the jig such that the spacers are located at different heights when in position between the shear web panels. The recesses may be displaced from one another on the jig such that, in use, the spacers are displaced from one another in a direction along the length of the shear web panels. Each jig may comprise a hole for passing a clamp through, the hole being positioned proximate to one of the spacer receiving recesses, the application of the urging forced being achieved by applying a clamp to the shear web panels in the vicinity of the spacer element proximate to the hole.

The jig may further comprise a body portion for receiving the spacer elements and a support member. The support member may include a mounting assembly configured to receive the first and second shear web panels, the body portion being located between the shear web panels in use. The mounting assembly may comprise two mounting edges, the mounting edges configured to receive and support the first and second shear web panels in alignment. The mounting assembly may be located, in use, beneath points of coupling, between the spacer elements to the panels, by a distance sufficient to accommodate a flange along the edge of at least one of the shear web panels that projects in a direction towards the other shear web panel. The body portion may optionally comprise first and second body panels having a separation between them to allow the spacers to extend into the spacing between the first and second body panels.

The jig may be configured such that, in use, there is no jig structure above any of the recesses so as to allow the shear webs to be lifted from the jig with the spacer elements. Optionally the body portion is comprised of two sections forming a substantially "L" shaped cross section, wherein in use a first section extends in a direction along the length of the shear web panel and a second section extends in a direction substantially perpendicular to the first section. Optionally the first section has a recess to receive a first spacer and the second section has a recess to receive a second spacer.

BRIEF DESCRIPTION OF THE DRAWINGS

Embodiments of the invention will now be described in more detail, by way of example only, and with reference to the following drawings in which.

DETAILED DESCRIPTION OF A PREFERRED EMBODIMENT

Figure 3:
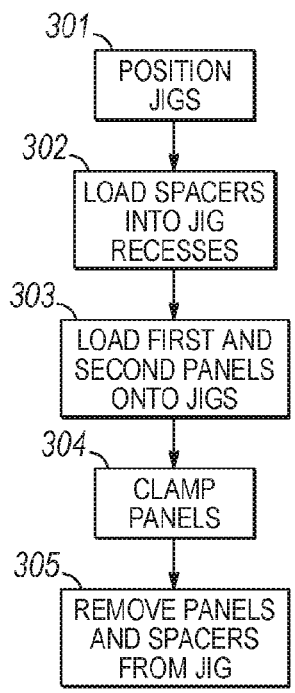
FIG. 3 is a flow diagram of a method of aligning shear web panels according to an embodiment of the invention.

FIG. 3 is a flow diagram of a general method that may be provided according to an embodiment of the invention. This general method will be discussed first, before discussing the specific construction of the components used in the method and specific aspects of the method.

At step 301 a number of jigs are positioned to receive and align two shear web panels. The purpose of the jigs is to support the shear web panels in an aligned position so that they can be coupled together. Once the panels have been coupled together, they can be removed from the jigs, in an aligned state, and inserted into a wind turbine blade.

Step 302 involves loading spacer elements onto the jigs, and particularly into recesses within the jigs. The purpose of the spacer elements is to maintain the correct spacing between the shear web panels so that they stay aligned with one another when they are removed from the jig. Strictly the spacer elements may be provided pre-loaded in the jigs so this step may not be necessary, but at some point spacer elements need to be loaded into the jigs.

At step 303 the first and the second panels are loaded onto the jigs, which as mentioned above support the panels in an aligned position relative to one another. The panels may be loaded one at a time, or they may be loaded simultaneously. The panels are loaded either side of the spacer elements, such that the spacer elements sit between the panels and provide resistance to the panels moving closer together. In order to couple the panels to the spacer elements at the points of connection, an adhesive may be applied to the spacers prior to step 303.

It will be appreciated that the spacer elements should, in use, extend beyond the body of the jig so that they physically contact the first and second shear web panels when they are mounted and can be connected to the panels such that when the panels are lifted from the jigs, the spacer elements are also removed from the jigs.

The panels may be clamped together at step 304, the clamping providing an urging force to keep the panels together once they are removed from the jigs. The clamping may not be required if the adhesive on the foam panels is strong enough to keep the panels together, although the use of clamps is preferred.

Once the panels are sufficiently held together the panels can be removed from the jigs, along with the spacers, at step 305. The panels are at this point aligned with one another from placement on the jig, and are ready to be inserted into the blade of a wind turbine as part of the construction process.

Figure 4:
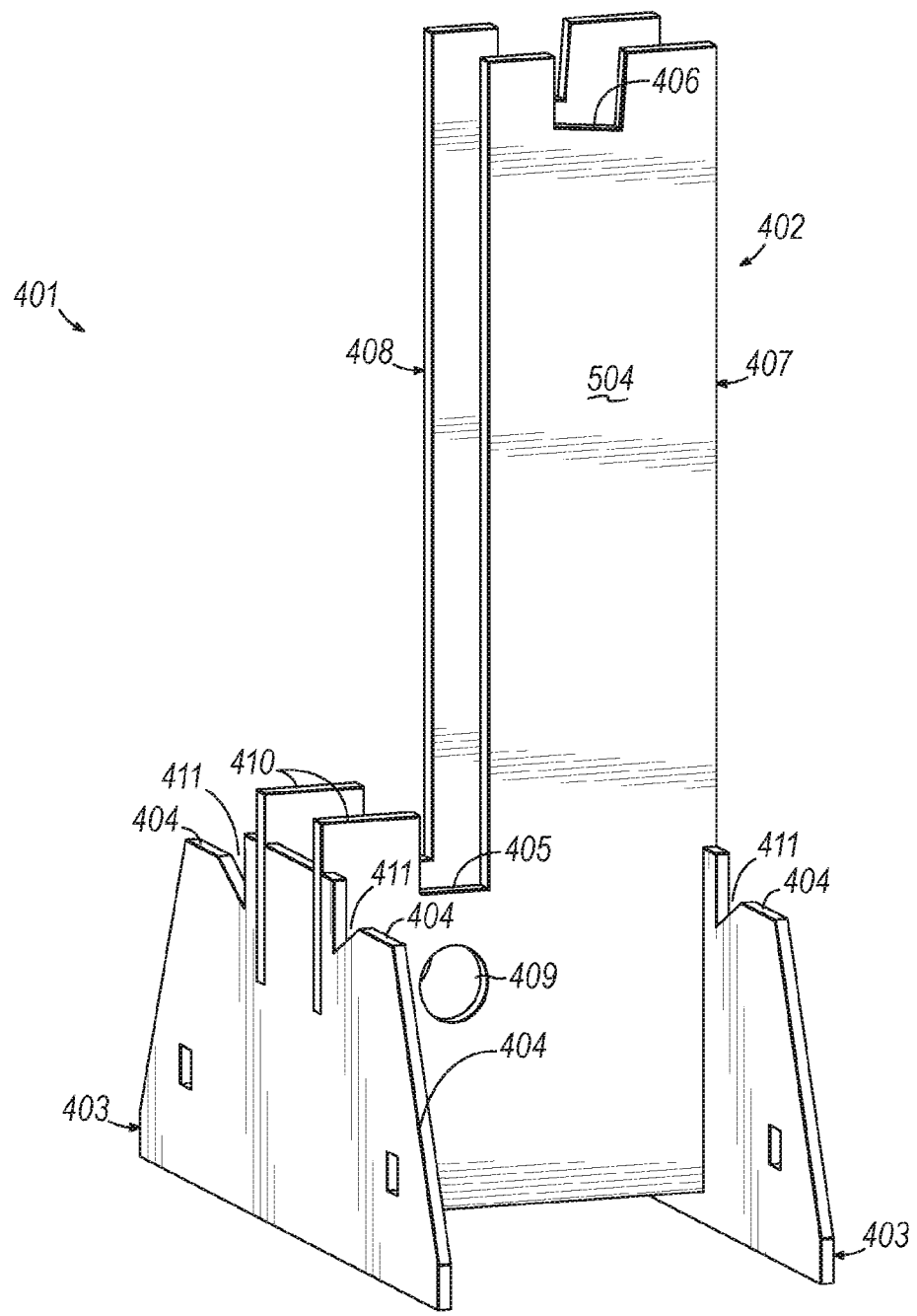
FIG. 4 is a perspective view of an example of a jig which may be used in methods according to embodiments of the invention.

FIG. 4 shows an example of a jig 401, which may be used in methods according to embodiments of the invention. The jig comprises a mounting assembly with first and second mounting surfaces, or mounting edges, onto which the first and second panels, respectively, can be placed so as to align them to one another. Multiple such jigs are used along the length of the panels so as to support the panels along their length.

The jig comprises a main body portion 402, which is supported by at least one support member 403. Preferably the support member 403 also incorporates mounting surfaces along one or more edges 404. The mounting surfaces are positioned either side of the main body portion 402 such that the main body portion is sandwiched between the first and second panels when they are mounted on the jig.

The support member 403 itself may have many different possible constructions, since its purpose is to support the jig in an upright position and to provide first and second mounting edges 404. The support member may 403, for example, comprise one or more trapezoidal panels located at respective sides of the jig, as shown in FIG. 4. Although FIG. 4 shows two support members 403, only one may be required. Alternatively, the support may comprise a panel, or body, of any other suitable shape, provided an appropriate mounting surface can be included.

The main body portion 402 has formed therein one or more recesses that receive and hold spacer elements. In the embodiment of FIG. 4, the body portion 402 has first and second recesses 405, 406.

Figure 5:
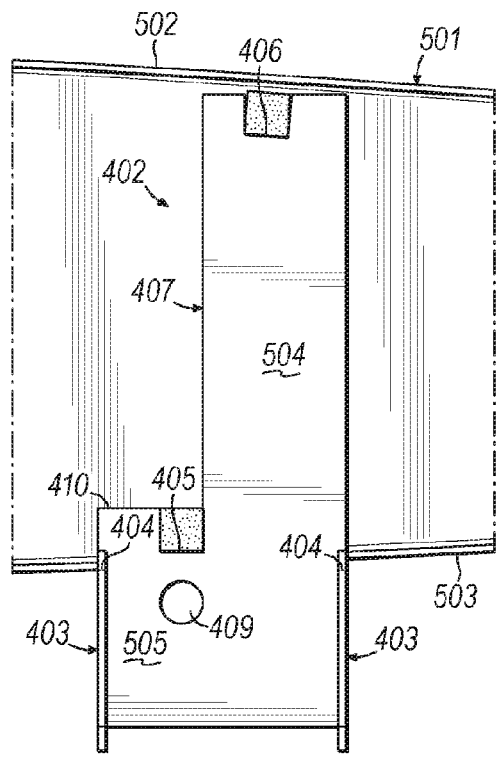
FIG. 5 is a side profile view of the jig of FIG. 4 when spacer elements have been inserted into the recesses and with a web panel loaded onto the jig.

FIG. 5 shows the jig of FIG. 4 in partial side profile when spacer elements have been inserted into the recesses and with a web panel 501 loaded onto the jig having longitudinal edges 502, 503. Like references with FIG. 4 are used for the same components. As can be seen from FIG. 5, the first recess 405 is located in a lower position relative to the second recess 406, when the jig is in use with one or more panels loaded. In particular, the first recess 405 may be located in a position such that, when a shear web panel 501 is positioned on the jig, a spacer element positioned within the first recess contacts the panel at, or in the region of, one longitudinal edge 503 of the panel. Correspondingly, the second recess 406 may be located in a position such that, when a shear web panel 501 is positioned on the jig, a spacer element positioned within the second recess contacts the panel at, or in the region of, the opposite longitudinal edge 502 of the panel. In other words, the recesses 405, 406 are separated in the vertical direction so that one spacer is positioned close to the lower edge 503 of the panels, and the second spacer is positioned close to the upper edge 502 of the panels, when the panels are positioned on the jig in use. This ensures that the spacers, when connected to the webs, are separated in the vertical direction from one another and also that they contact the panels at or near their edges.

In addition, it can be seen from FIG. 5 that the first recess 405 is displaced from the other 406 on the jig such that, in use, spacers located in the recesses are displaced from one another in a direction along the length of the shear web panels when installed in the recess.

A benefit of the displacement in the horizontal direction is that the jig is formed in such a manner as to allow the spacers to then be spaced vertically from one another, but can still be removed from the jig by lifting them out substantially vertically. This arrangement means that the jig is configured such that there is no jig structure above any of the recesses, so as to allow the shear webs to be lifted from the jig with the spacer elements. This is useful when removing the shear web panels from the jig, as the spacer elements can be lifted out with the panels as a single assembly. To achieve the above mentioned spacing of the spacer elements the jig may be configured to have a horizontal extension having the first 405 recess formed in it, and a vertical extension having the second recess 406 formed in it. In particular, the main body 402 of the jig may have a general "L" shaped configuration, or mirror image thereof, as shown in FIGS. 4 and 5. The horizontal extension 505 of the "L" shape has the first recess 405 formed in it, whereas the vertical extension 504 of the "L" shape has the second recess 406 formed in it.

Figure 6:
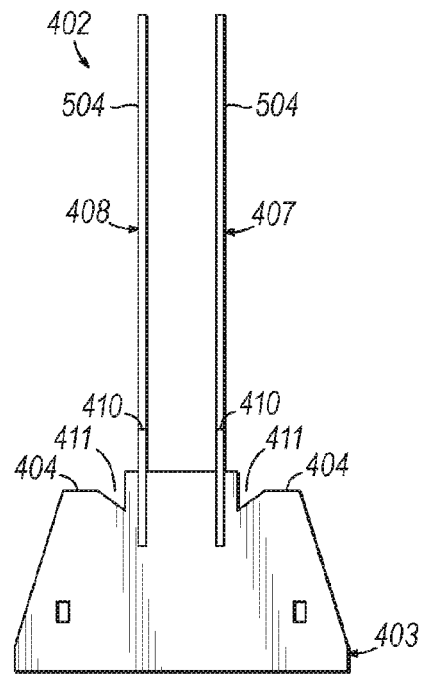
FIG. 6 is an edge on profile view of the jig of FIG. 4.

FIG. 6 shows an edge on profile view of the jig of FIG. 4, with like reference numerals given to like features. FIG. 6 will be used to highlight certain further features of the jig 401.

Figure 1:
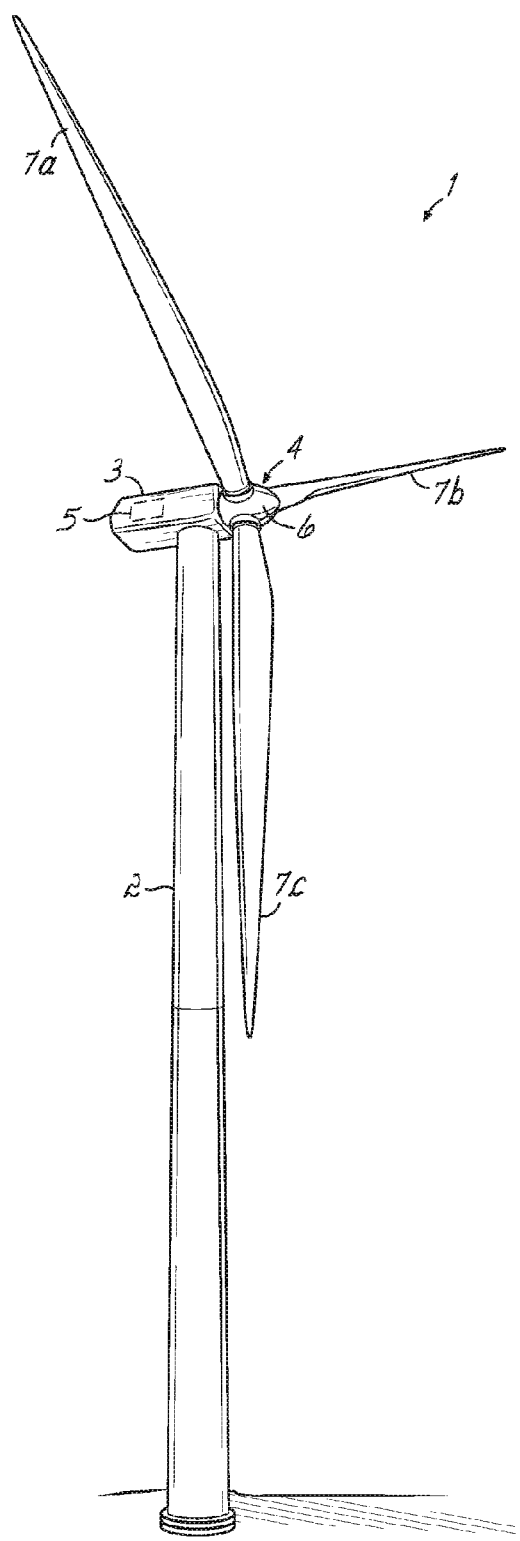
FIG. 1 illustrates the main structural components of a wind turbine.
Figure 2:
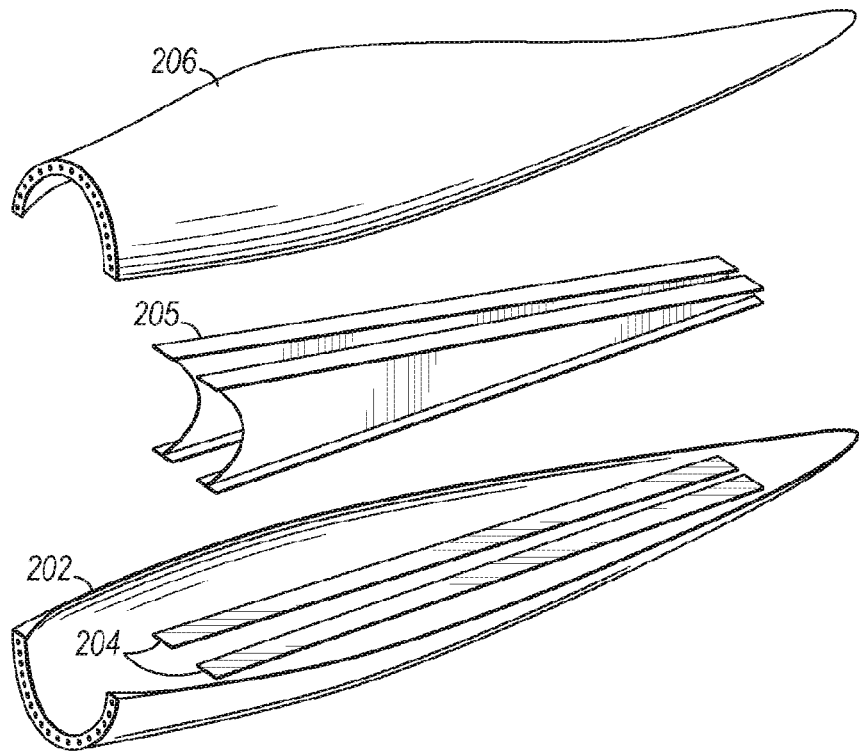
FIG. 2 is an exploded perspective view of an example of the elements used in a wind turbine blade.

As mentioned above, the mounting assembly comprises two mounting edges 404 configured to receive and support the first and second shear web panels in alignment. Whilst the mounting edges may simply be straight edges, the mounting edges may also be constructed to have a form complementary to a flange located on the shear web panels. A typical shear web, such as the type shown in FIG. 2, may include one or more flanges along a longitudinal, or span-wise, edge of the flange that may extend in a direction substantially perpendicular to the plane of the web panel. Such flanges are used to adhere the shear web to the inner surface of the wind turbine blade shell during construction, and when mounted on the jig the flange may project in a direction towards the other shear web panel. Therefore, the mounting edges 404 may further include a cutaway portion 411 to accommodate a flange on the panels. Furthermore, the mounting edges 404 of the mounting assembly may be positioned, in use, beneath the points of coupling between the spacer elements to the panels by a distance sufficient to accommodate a flange on the shear webs. This may be achieved by locating the mounting edges 404 beneath the lowest recess 405 when the jig is in the orientation of use. This arrangement can be seen in FIG. 5, where it can be seen that the supported panel 501 is supported such that its lower edge 503 extends just beneath the spacer mounted in recess 405.

In FIG. 6, it can be seen that the body portion 402 may be comprised of first and second body panels 407, 408. The line labelled 410 shows the top of the ridge used to form the first recess 405. There is a separation between the body panels which provides a space into which a portion of the spacer elements may extend between the first and second body panels when the spacer is mounted in a recess. The body panels may be connected together by a structure between them, but preferably a space between at least a portion of the two panels is still formed. A space of this nature allows the spacer elements to have a construction such as that shown in FIG. 7.

Figure 7A:
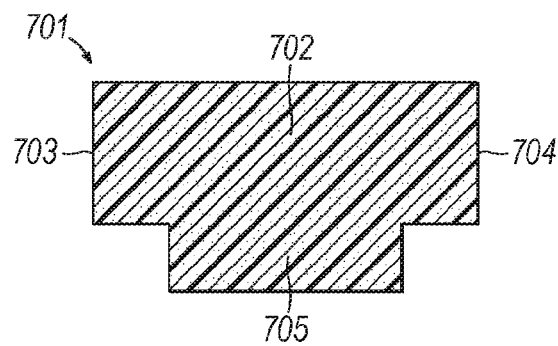
FIG. 7 shows, in FIGS. 7(a) and 7(b), possible cross sections of examples of the spacer element.
Figure 7B:
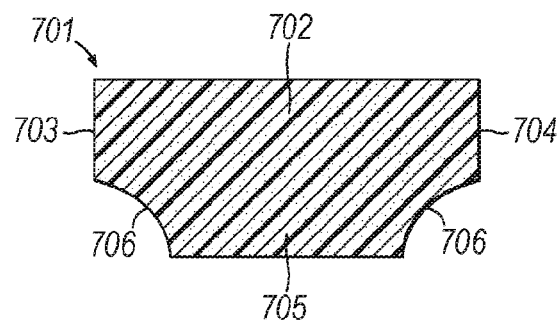

FIG. 7 shows two possible cross sections of the spacer element 701. As can be seen, the spacer is generally "T" shaped, with a first portion 702 having first and second contact edges 703, 704 for engaging with the shear web panels when they are mounted on the jig. In addition, a second portion 705 is provided which functions as an engagement section. FIG. 7(a) shows a generally straight edged shape, whereas FIG. 7(b) shows an alternative in which the engagement section may be formed by cutaway portions 706.

The engagement section 705 is provided to engage with a marker that is positioned on the inner surface of a turbine blade. Matching the engagement section to the marker ensures correct alignment of the two panels within the blade. Since the spacer element may be constructed of a relatively soft material, such as a lightweight foam, the engagement means may need to be nothing more than a portion of material that extends into the main body of the spacer to contact a marker, which may penetrate or distort the engagement means.

As mentioned above, the spacers are received within the recesses 405, 406, of the jigs so as to contact the shear web panels along the long edges of the shear web panels when they are mounted on the jigs. The spacers having an engagement section need only be positioned along one edge of the shear web panels, since only one edge of the final shear web assembly will be engaged with markers on the blade shell. The spacers used for the other edge may simply be blocks, effectively comprising only the first portion 702 without the engagement section 705. The engagement section of the spacer 701 needs to, when coupled to the shear web panels, extend in a direction towards the edge of the shear web panel and to extend to the edge, and optionally just past it, such that when the shear web panel is positioned on the inner surface of the blade shell, the engagement section can engage with a marker, that will also be located on the inner surface of the blade shell. This is highlighted in FIG. 8.

Figure 8:
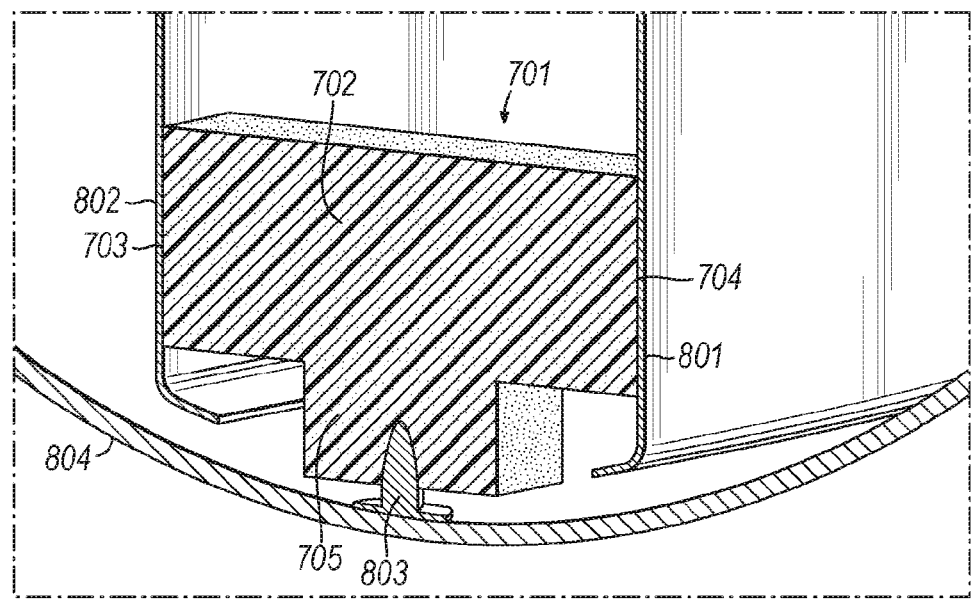
FIG. 8 is a perspective view of a spacer when connected to shear web panels and positioned within a wind turbine blade.

FIG. 8 uses like reference numbers from FIG. 7 where applicable, and shows spacer element 701 coupled to shear web panels 801, 802 on either side with a marker 803 positioned on the inner surface of the blade shell 804. The engagement portion 705 of the spacer is engaged with the marker/engagement marker 803, which is in the form of a spike or "witches hat" that penetrates into the foam of the spacer element. As can be seen, the engagement portion 705 of the spacer extends to the point of the flanges of the panels 801, 802 so that when the flanges are positioned on the inner surface of the blade shell 804, the engagement portion 705 also reaches, or almost reaches, the blade shell so that it engages with the marker 803. To account for the curvature of the blade shell, the engagement portion may extend beyond the flanges of the panels by an amount sufficient to allow engagement with the marker.

Referring back to FIG. 4, a further feature of the jig is recess or hole 409. The purpose of hole 409 is to allow a clamp to pass through the body of the jig to apply a clamping force to urge together the two panels. The hole 409 is positioned beneath the mounting edge 404 such that the hole, and therefore the clamp, is clear of the shear web panels when they are mounted. The hole is adjacent to, or in the vicinity of, the recess 405 such that the clamping action can be applied to the panels in the general area of the spacer element so that the clamping force may be applied through said spacer.

A method of aligning two shear web panels using a plurality of jigs of the type detailed above will now be described in relation to FIG. 9.

Figure 9A:
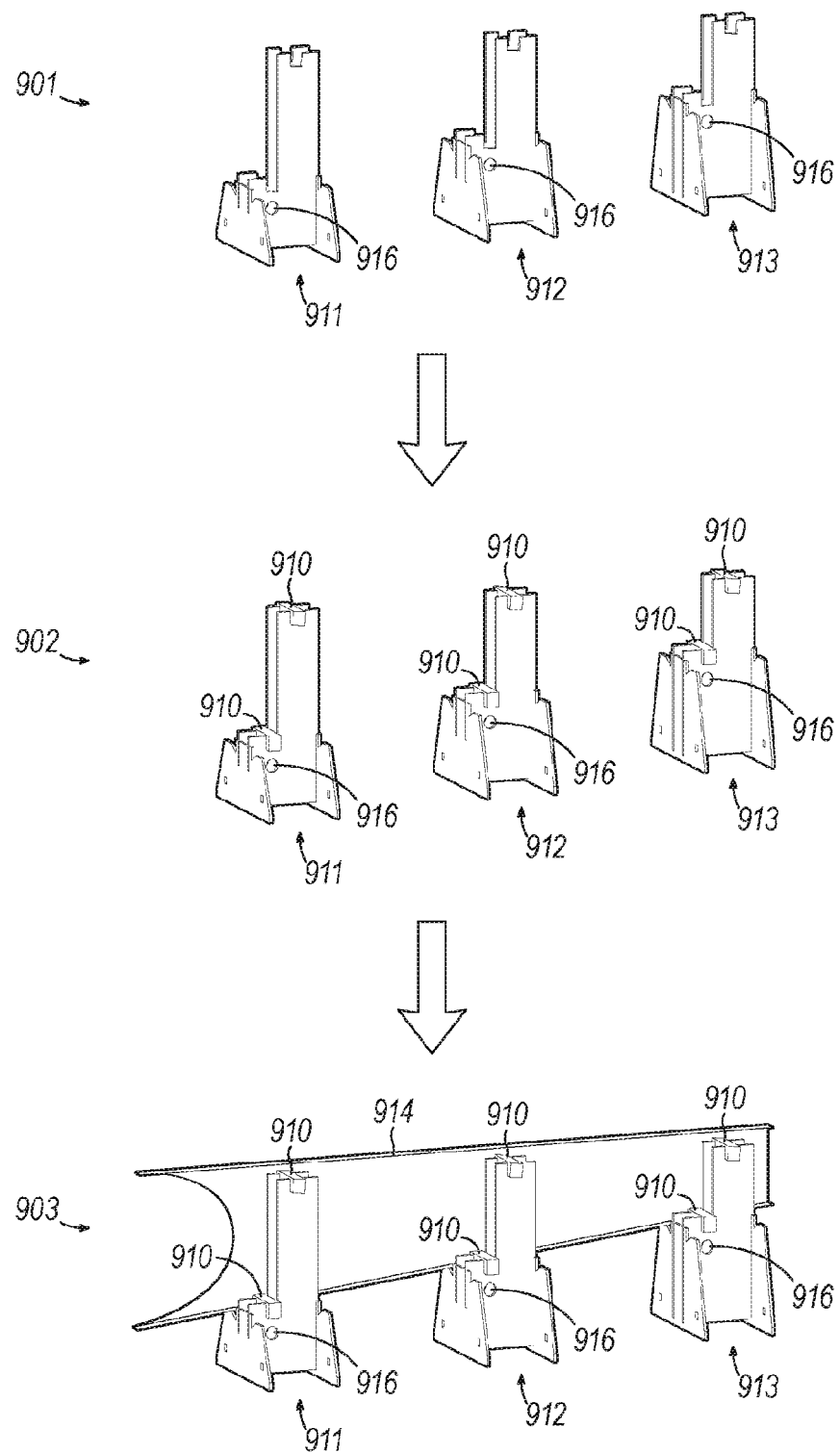
FIG. 9 is an illustration, shown in FIGS. 9(a) and 9(b), of the steps involved in a method of aligning shear web panels according to an embodiment of the invention.

FIG. 9(a) shows the first step 901 wherein a plurality of jigs 911, 912, 913, of the sort described in relation to FIG. 4 have been positioned in alignment to receive first and second shear web panels. The jigs may be evenly spaced and are arranged in a straight line such that the respective mounting edges on each side of the jig body align along a straight line. At step 902 the spacer elements 910 are inserted into the jig recesses, although as with the general method of FIG. 3 it will be appreciated that this step may not be required if the spacers have been preloaded.

At step 903 a first panel 914 is loaded onto the jigs and engages with the spacer elements. It will be appreciated at this point that the panel has a tapering height along its longitudinal, or spanwise, length. This tapering means that the distance between the longitudinal edges of the panel decreases over the length of the panel. In order to account for this tapering it can be seen that each jig has a slightly different configuration, whereby the relative heights of the mounting edge 404, and the first recess 405, vary between jigs. In particular, the relative heights of the mounting edge and the first recess increase from jig to jig along the spanwise length of the panel towards the blade tip end of the panel. In this way, the heights of the mounting edges 404 from the base of the jig are configured, for each jig, to correspond to the tapering of the panels at the point along the panel at which the jig engages. The height of the first recess 405 varies according to the height of the mounting edge 404 as described above, for example to accommodate the panel flange.

Since the height of the mounting edges compensates for the tapering of the panels, the relative heights of the second, upper, recesses 406 may not need to vary from jig to jig since the top edge 502 of the panel may be held substantially horizontal. This is the case in the example of FIG. 9. However, as an alternative, the relative heights of the mounting edges 404 may be kept constant from jig to jig, and the relative heights of the second recesses 406 may be varied. To accommodate for the tapering of the panel the height of the second recess would need to decrease from jig to jig along the spanwise length of the panel towards the blade tip end of the panel. If the relative heights of the mounting edges 404 are kept constant then the same can, optionally, be true for the relative heights of the first recess 405.

A combination of varying the relative heights of the mounting edges and the second recess can be used from jig to jig in order to compensate for the taper of the panels. Along the spanwise length of the panel towards the blade tip end of the panel the relative heights of the mounting edges would increase and the relative heights of the second recess would decrease from jig to jig.

Adhesive is added to the spacer elements 910 prior to step 903 so that they adhere to the web panels when they are positioned on the jigs.

Figure 9B:
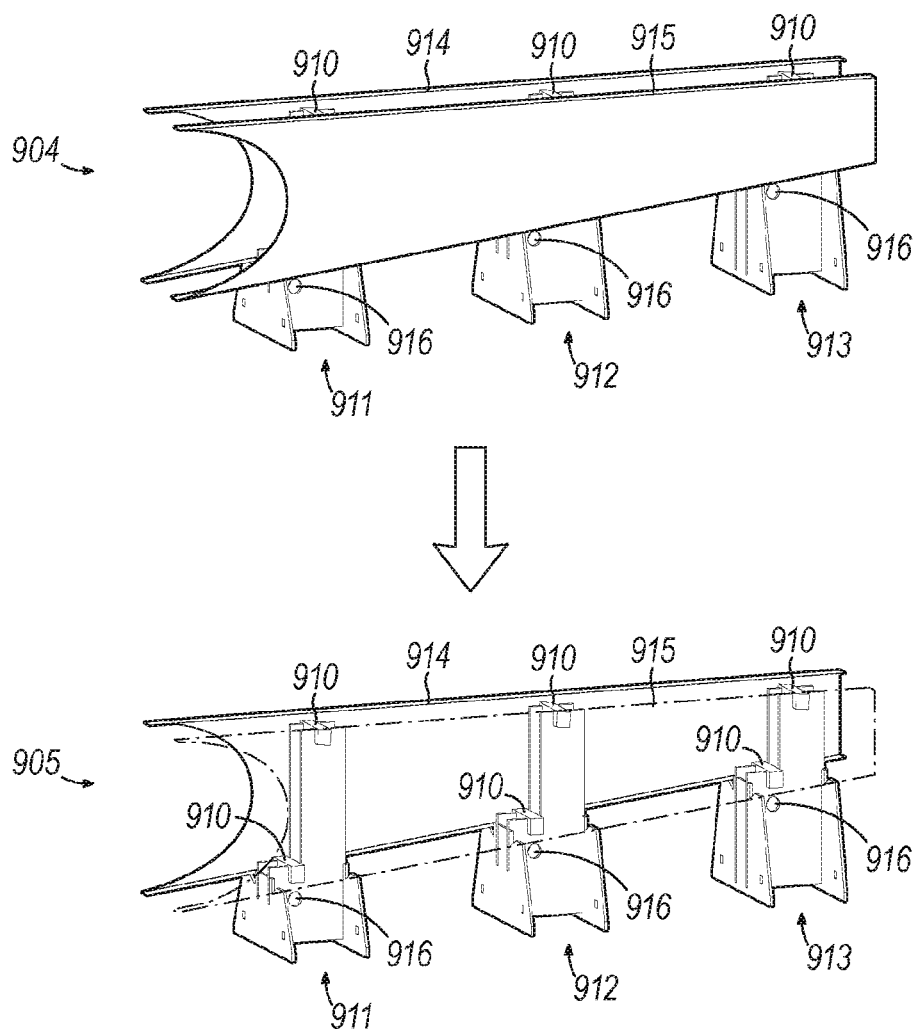

FIG. 9(b) shows how the method continues from step 903. At step 904, the second shear web panel 915 is positioned on the corresponding mounting edges of the jigs 911, 912, 913 and engaged with the spacer elements 910. At this point the two panels 914, 915 are aligned and coupled together by the spacer elements mounted on the jig.

At step 905 a clamp may be fed through the holes 916 provided in each jig. Pressure from the clamps is applied directly to the spacer elements, avoiding undue forces on the panels. At this point the panels are aligned, adhesively bonded together and ready to be removed from the jigs and inserted into a wind turbine blade.

A method of inserting two aligned web panels, aligned according to the methods described above, will now be described in relation to FIG. 10.

Figure 10A:
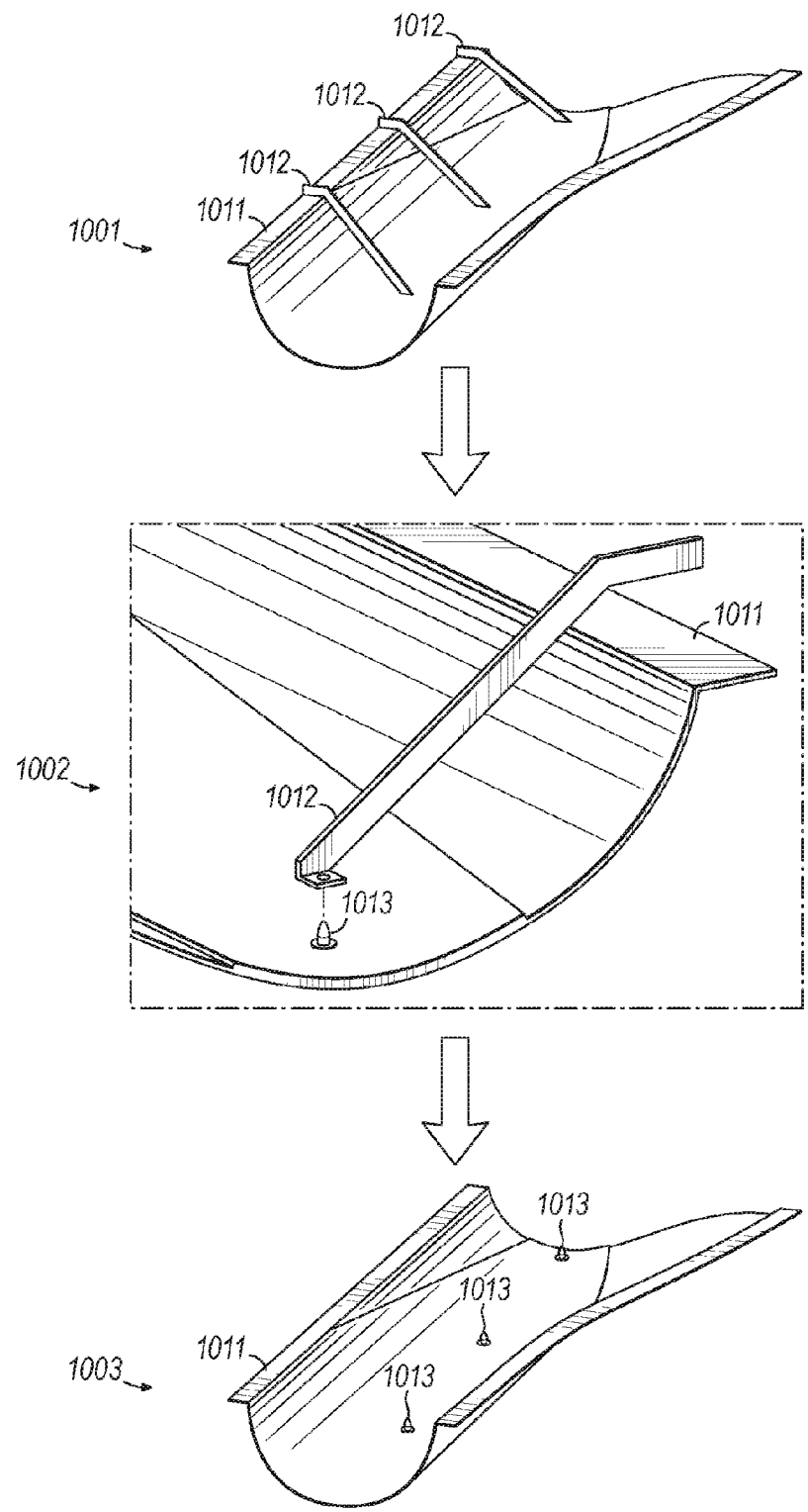
FIG. 10 is an illustration, shown in FIGS. 10(a) and 10(b), of the steps involved in a method of inserting a web assembly into a wind turbine blade.

FIG. 10(a) shows an example of the steps that can be taken to prepare a wind turbine blade for receiving the web panels. Starting at step 1001, a portion of a shell of a wind turbine blade 1011 is provided, which will typically be a half shell of a turbine blade, the complete blade shell being formed by assembling together two corresponding half shells. Positioning members 1012 are used to position accurately a plurality of engagement markers along the length of the blade portion. The positioning members 1012 may engage with the mould in which the blade shell portion sits, or with the blade portion itself, and extend to a point on the inner surface of the blade shell to locate the appropriate position for the engagement markers. In particular, the positioning members may abut the leading or trailing edge of the blade portion. The positioning members 1012 in FIG. 10 are in the general shape of hockey sticks, and may be referred to as such.

At step 1002 an engagement marker 1013 is placed at the location on the inner surface of the blade shell 1011 indicated by the positioning member 1012. The positioning member 1012 may also include a recess or hole to guide the engagement marker 1013 into the correct position accurately. The engagement markers are positioned along at least a portion of the length of the shell and the hockey stick positioning members are removed. The engagement markers 1013 may be held in position be adhesive. Step 1003 shows a plurality of engagement markers 1013 in position and ready to receive the shear web panels. Adhesive will also be applied along the length of the blade shell where the flanges of the shear webs panels will be located.

Figure 10B:
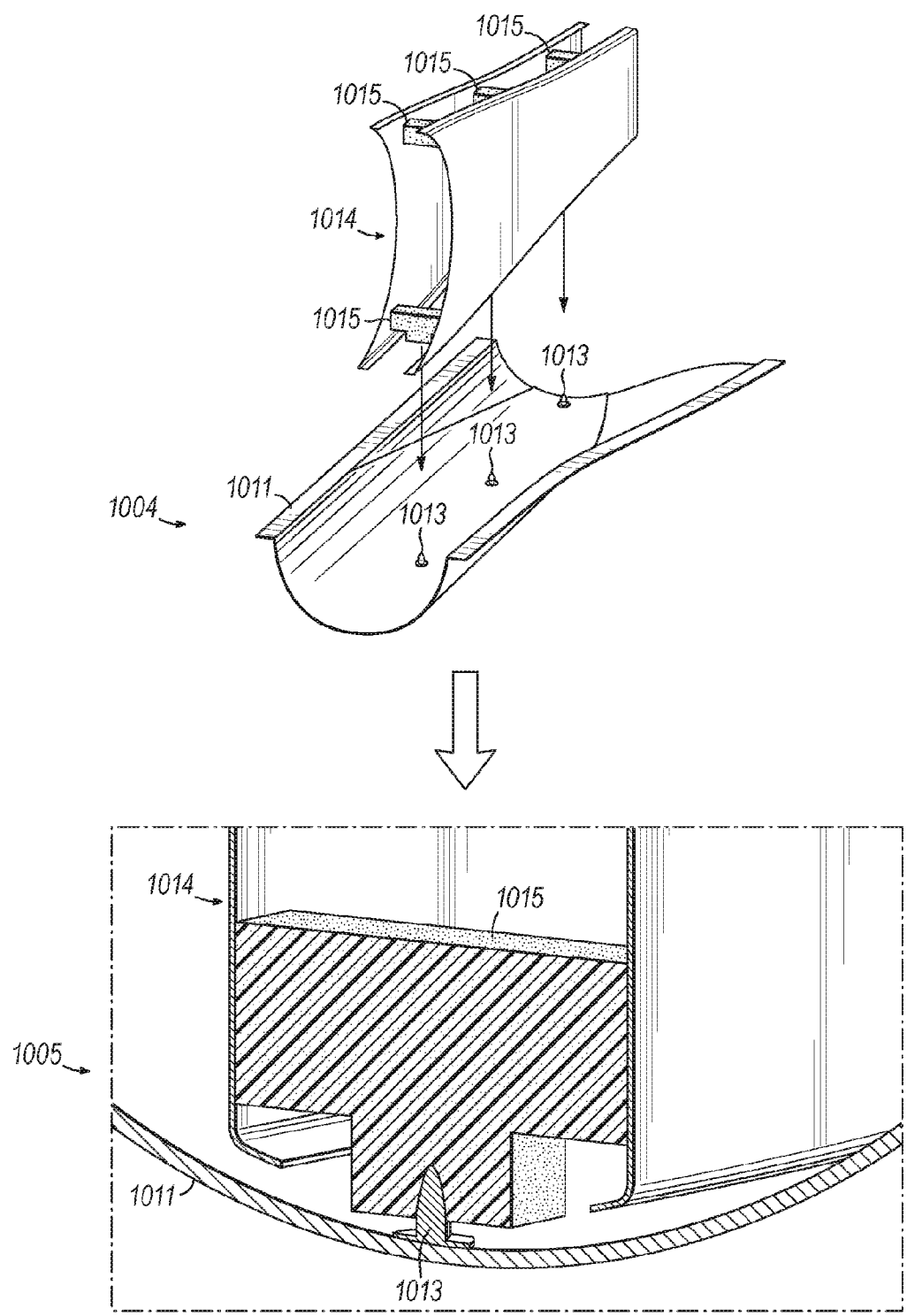

FIG. 10(b) continues the method. At step 1004 the web assembly 1014, comprising the two shear web panels and the spacing elements is positioned over the shell and lowered into position as indicated by the arrows. The web assembly is oriented such that the spacing elements 1015 having an engagement means formed thereon, as described in relation to FIGS. 7 and 8, are able to contact and engage with the engagement markers 1013. The engagement markers 1013, which may be referred to as "witches hats", preferably have a tapering construction such that they come to a point. The engagement markers contact the spacer elements along the edge of the web assembly and have a complementary recess which receives the witches hat. The result is shown in step 1005, which is essentially the same as the cross section of FIG. 8 but is reproduced for convenience.

Using the engagement markers to align the spacer elements provides a convenient and quick way of correctly mounting the web assembly into a turbine blade. The web assembly can then be attached to the shell of the blade, such as by adhesive, and the clamps, if not done previously, can be removed. The blade can then be finished by coupling together the two shell halves.

Since the spacer elements are preferably constructed using lightweight materials, the spacers can be left in the web assembly once it is attached to the blade. Alternatively, since the spacers preferably do not transfer any substantial loads, they can be removed once the shear web panels have been installed.

Whilst specific jig structures and spacer element structures have been described above, it will be appreciated that different structures are possible that fall within the scope of the claims and can be used to implement methods according to embodiments of the invention.

The invention claimed is:

1. A method of aligning shear webs for the construction of a wind turbine blade, the method comprising:
providing one or more jigs, each configured to receive one or more spacer elements;
providing one or more spacer elements;
placing first and second shear web panels on the one or more jigs to align them;
restraining the first and second shear web panels relative to each other, the shear web panels being separated by the one or more spacer elements; and
removing the first and second shear web panels together with the one or more spacer elements from the jig.

2. The method according to claim 1 wherein restraining the first and second shear web panels includes applying adhesive to the one or more spacer elements to adhere the spacer elements to each of the shear web panels.

3. The method according to claim 1 wherein restraining the first and second shear web panels includes applying an urging or clamping force to urge them together.

4. The method according to claim 1 wherein the one or more jigs each comprise one or more recesses for receiving spacer elements.

5. The method according to claim 4 wherein the one or more jigs each comprise at least two recesses for receiving spacers, the recesses being located, in use, at different heights to one another on the jig such that the spacers are located at different heights when in position between the shear web panels.

6. The method according to claim 5 wherein the recesses are further displaced from one another on the jig such that, in use, the spacers are displaced from one another in a direction along the length of the shear web panels.

7. The method according to claim 4, wherein each jig comprises a hole for passing a clamp through, the hole being positioned proximate to one of the spacer receiving recesses, the application of an urging force being achieved by applying a clamp to the shear web panels in the vicinity of the spacer element proximate to the hole.

8. The method according to claim 1 wherein each of the one or more jigs comprise a body portion for receiving the spacer elements and a support member.

9. The method according to claim 8 wherein the support member includes a mounting assembly configured to receive the first and second shear web panels, with the body portion being located between the shear web panels when they are mounted on the jigs.

10. The method according to claim 9 wherein the mounting assembly comprises two mounting edges, the mounting edges configured to receive and support the first and second shear web panels in alignment.

11. The method according to claim 10 wherein the mounting edges have a form complementary to a flange on the shear web panels.

12. The method according to claim 9 wherein the mounting assembly is located, in use, beneath points of coupling between the spacer elements to the panels by a distance sufficient to accommodate a flange along the edge of at least one of the shear web panels.

13. The method according to claim 8 wherein the body portion comprises first and second body panels having a separation between them to allow a portion of the spacers to extend into the spacing between the first and second body panels.

14. The method according to claim 4 wherein the jig is configured such that, in use, there is no jig structure above recesses in the jig so as to allow the shear webs to be lifted from the jig with the spacer elements.

15. The method according to claim 14 wherein a body portion of the jig is comprised of two sections forming a substantially "L" shaped cross section, wherein, in use, a first section extends in a direction along the length of the shear web panel and a second section extends in a direction substantially perpendicular to the first section.

16. The method according to claim 15 wherein the first section has a recess to receive a first spacer and the second section has a recess to receive a second spacer.

17. The method according to claim 1 wherein the step of providing one or more jigs comprises providing a plurality of jigs spaced apart along the length of the shear web panels to receive the first and second shear web panels.

18. The method according to claim 17 wherein the height of one or more of the spacers, when mounted on each jig, and/or the height at which each jig supports the first and second shear web panels varies from jig to jig over the length of the panel.

19. The method according to claim 18 wherein the relative height of the spacers decreases from jig to jig along the spanwise length of the panel towards the blade tip end of the panel and/or the relative height at which each jig supports the first and second shear web panels increases from jig to jig along the spanwise length of the panel towards the blade tip end of the panel.

20. The method according to claim 1 wherein the spacers are comprised of a lightweight material.

21. The method according to claim 1 wherein at least some of the spacers comprise an engagement section for receiving a marker positioned on the inner surface of a turbine blade for correctly positioning the shear web panels in the blade.

22. The method according to claim 21 wherein the spacers are received on the jigs so as to contact the shear web panels along the long edges of the shear web panels when the shear web panels are mounted on the jigs, and wherein the spacers positioned along one of the edges of the shear webs comprise an engagement section, the engagement section being of reduced length along the direction between the first and second shear web panels and extending in a direction towards the edge of the shear web and extending at least to said edge.

23. The method according to claim 21 wherein the spacers having an engagement section are substantially "T" shaped in cross section.

24. The method according to claim 1 wherein the one or more jigs are provided together with one or more spacer elements, the spacer elements being pre-loaded on the jigs.

25. The method according to claim 1 further comprising the step of placing the one or more spacer elements on the one or more jigs, the step being performed before placing the first and second shear web panels on the one or more jigs.

26. The jig for use in the method of claim 1, the jig comprising:
one or more recesses for receiving one or more spacer elements; a mounting assembly configured to support first and second shear web panels such that the recesses for the spacer elements are located between the shear web panels when mounted on the jig.

27. The jig according to claim 26 comprising at least two recesses for receiving spacers, the recesses being located, in use, at different heights to one another on the jig such that the spacers are located at different heights when in position between the shear web panels.

28. The jig according to claim 27 wherein the recesses are displaced from one another on the jig such that, in use, the spacers are displaced from one another in a direction along the length of the shear web panels.

29. The jig according to claim 27 further comprising a hole for passing a clamp through, the hole being positioned proximate to one of the spacer receiving recesses, the application of the urging forced being achieved by applying a clamp to the shear web panels in the vicinity of the spacer element proximate to the hole.

30. The jig according to claim 27 further comprising a body portion for receiving the spacer elements and a support member.

31. The jig according to claim 30 wherein the support member includes a mounting assembly configured to receive the first and second shear web panels, the body portion being located between the shear web panels in use.

32. The jig according to claim 31 wherein the mounting assembly comprises two mounting edges, the mounting edges configured to receive and support the first and second shear web panels in alignment.

33. The jig according to claim 32 wherein the mounting assembly is located, in use, beneath points of coupling between the spacer elements to the panels by a distance sufficient to accommodate a flange along the edge of at least one of the shear web panels.

34. The jig according to claim 30 wherein the body portion comprises first and second body panels having a separation between them to allow the spacers to extend into the spacing between the first and second body panels.

35. The jig according to claim 26 wherein the jig is configured such that, in use, there is no jig structure above any of the recesses so as to allow the shear webs to be lifted from the jig with the spacer elements.

36. The jig according to claim 35 wherein a body portion of the jig is comprised of two sections forming a substantially "L" shaped cross section, wherein in use a first section extends in a direction along the length of the shear web panel and a second section extends in a direction substantially perpendicular to the first section.

37. The jig according to claim 36 wherein the first section has a recess to receive a first spacer and the second section has a recess to receive a second spacer.

38. A plurality of jigs according to claim 26, the jigs being spaced apart from one another and aligned such that the mounting assemblies support first and second shear web panels along a straight line, wherein the height of one or more of the recesses on each jig and/or the height at which the mounting assembly of each jig supports the first and second shear web panels is varied from jig to jig over the length of the panel.

39. The plurality of jigs according to claim 38 wherein the relative height of the recesses decreases from jig to jig along the spanwise length of the panel towards the blade tip end of the panel and/or the relative height at which the mounting assemblies support the first and second shear web panels increases from jig to jig along the spanwise length of the panel towards the blade tip end of the panel.

40. A wind turbine blade comprising shear webs aligned according to the method of claim 1.

41. A wind turbine having one or more blades according to claim 40.

42. A method of inserting two aligned shear webs, into a wind turbine blade formed from two opposing half-shells, the method comprising:
providing a half-shell of a wind turbine blade;
spacing markers along the inner surface of the shell, the spacings between the markers corresponding to the spacings between respective spacer elements of the shear webs;
aligning the spacers of the shear webs with the markers;
engaging the spacers with the markers; and
fixing the shear webs to the inner surface of the shell.

* * * * *